United States Patent
Liu et al.

(10) Patent No.: US 11,270,158 B2
(45) Date of Patent: Mar. 8, 2022

(54) INSTANCE SEGMENTATION METHODS AND APPARATUSES, ELECTRONIC DEVICES, PROGRAMS, AND MEDIA

(71) Applicant: BEIJING SENSETIME TECHNOLOGY DEVELOPMENT CO., LTD., Beijing (CN)

(72) Inventors: Shu Liu, Beijing (CN); Lu Qi, Beijing (CN); Haifang Qin, Beijing (CN); Jianping Shi, Beijing (CN); Jiaya Jia, Beijing (CN)

(73) Assignee: BEIJING SENSETIME TECHNOLOGY DEVELOPMENT CO., LTD., Beijing (CN)

( * ) Notice: Subject to any disclaimer, the term of this patent is extended or adjusted under 35 U.S.C. 154(b) by 137 days.

(21) Appl. No.: 16/729,423

(22) Filed: Dec. 29, 2019

(65) Prior Publication Data
US 2020/0134365 A1    Apr. 30, 2020

Related U.S. Application Data

(63) Continuation of application No. PCT/CN2019/073819, filed on Jan. 30, 2019.

(30) Foreign Application Priority Data

Feb. 9, 2018  (CN) .......................... 201810136371.0
Feb. 9, 2018  (CN) .......................... 201810137044.7

(51) Int. Cl.
G06K 9/62 (2006.01)
G06K 9/32 (2006.01)
(Continued)

(52) U.S. Cl.
CPC ......... *G06K 9/6232* (2013.01); *G06K 9/3233* (2013.01); *G06K 9/46* (2013.01);
(Continued)

(58) Field of Classification Search
None
See application file for complete search history.

(56) References Cited

U.S. PATENT DOCUMENTS 9,881,234 B2   1/2018  Huang et al.
2019/0057507 A1*  2/2019  El-Khamy ............... G06T 7/11

FOREIGN PATENT DOCUMENTS

CN   105512661 A   4/2016
CN   106250812 A   12/2016
(Continued)

OTHER PUBLICATIONS

F. B. Tesema, J. Lin, J. Ou, H. Wu and W. Zhu, "Feature Fusing of Feature Pyramid Network for Multi-Scale Pedestrian Detection," 2018 15th International Computer Conference on Wavelet Active Media Technology and Information Processing (ICCWAMTIP), 2018, pp. 10-13, doi: 10.1109/ICCWAMTIP.2018.8632614. (Year: 2018).*

(Continued)

*Primary Examiner* — Justin P. Misleh

(57) ABSTRACT

An instance segmentation method includes: performing feature extraction on an image via a neural network to output features at at least two different hierarchies; extracting region features corresponding to at least one instance candidate region in the image from the features at the at least two different hierarchies, and fusing region features corresponding to a same instance candidate region, to obtain a first fusion feature of each instance candidate region; and performing instance segmentation based on each first fusion feature, to obtain at least one of an instance segmentation result of the corresponding instance candidate region or an instance segmentation result of the image.

20 Claims, 10 Drawing Sheets

(51) Int. Cl.
  *G06K 9/46* (2006.01)
  *G06N 3/04* (2006.01)
  *G06T 7/11* (2017.01)

(52) U.S. Cl.
  CPC ........... *G06K 9/629* (2013.01); *G06N 3/0454* (2013.01); *G06T 7/11* (2017.01); *G06T 2207/20084* (2013.01)

(56) References Cited

FOREIGN PATENT DOCUMENTS

| CN | 106709924 | A | 5/2017 |
|---|---|---|---|
| CN | 107085609 | A | 8/2017 |
| CN | 107169974 | A | 9/2017 |
| CN | 107424159 | A | 12/2017 |
| CN | 107483920 | A | 12/2017 |
| CN | 108335305 | A | 7/2018 |
| CN | 108460411 | A | 8/2018 |
| EP | 3156942 | A1 | 4/2017 |

OTHER PUBLICATIONS

A. D. Costea, A. Petrovai and S. Nedevschi, "Fusion Scheme for Semantic and Instance-level Segmentation," 2018 21st International Conference on Intelligent Transportation Systems (ITSC), 2018, pp. 3469-3475, doi: 10.1109/ITSC.2018.8570006. (Year: 2018).*

Shu Liu, Lu Qi, Haifang Qin, Jianping Shi, and Jiaya Jia. Path aggregation network for instance segmentation. In Proceedings of the IEEE Conference on Computer Vision and Pattern Recognition (CVPR), pp. 8759-8768, 2018. (Year: 2018).*

Shu Liu, Lu Qi et al; Path Aggregation Network for Instance Segmentation; mailed on Sep. 18, 2018.

Kaiming He et al; "Mask R-CNN"; 2017 IEEE International Conference on Computer Vision (ICCV); Dec. 25, 2017.

"Technology Sharing of Jia Jiaya Port Chinese Team Champion: The Most Effective COCO Object Segmentation Algorithm"; "New Zhiyuan-WeChat Official Account"; Nov. 2, 2017.

Tsung-Yi Lin et al; "Feature Pyramid Networks for Object Detection"; 2017 IEEE Conference on Computer Vision and Pattern Recognition (CVPR); Nov. 9, 2017.

Feng Jiang et al, Survey on Content-Based Image Segmentation Methods; ISSN 1000-9825,CODEN RUXUEW; Nov. 4, 2016.

International Search Report in the international application No. PCT/CN2019/073819, dated Apr. 26, 2019.

First Office Action of the Chinese application No. 201810137044.7, dated Mar. 9, 2020.

First Office Action of the Chinese application No. 201810136371.0, dated Dec. 24, 2019.

Wang Xia etc., Transducer and Microsystem Technologies, "Mask speech recognition based on convolutional neural network", vol. 36 (10), issued on Oct. 10, 2017.

English translation of the Written Opinion of the International Search Authority in the international application No. PCT/CN2019/073819, dated Apr. 26, 2019.

* cited by examiner

INSTANCE SEGMENTATION METHODS AND APPARATUSES, ELECTRONIC DEVICES, PROGRAMS, AND MEDIA

CROSS-REFERENCE TO RELATED APPLICATIONS

The present application is a continuation of International Application No. PCT/CN2019/073819 filed on Jan. 30, 2019, which claims the priority of Chinese patent applications No. CN201810137044.7 and No. CN201810136371.0 submitted on 9 Feb. 2018. The disclosures of these applications are hereby incorporated by reference in their entirety.

BACKGROUND

Instance segmentation is an important direction in the field of computer vision; this task combines characteristics of both semantic segmentation and object detection; an independent pixel-level mask is generated for each object of an input image, respectively, and a class corresponding thereto is predicted. The instance segmentation has wide applications in fields of autonomous driving, domestic robots, etc.

SUMMARY

The present disclosure relates to computer vision technologies, and in particular, to instance segmentation methods and apparatuses, electronic devices, programs, and media.

Embodiments of the present disclosure provide an instance segmentation solution.

According to an aspect of embodiments of the present disclosure, an instance segmentation method is provided, including: performing feature extraction on an image via a neural network to output features at at least two different hierarchies; extracting region features corresponding to at least one instance candidate region in the image from the features at the at least two different hierarchies, and fusing region features corresponding to a same instance candidate region, to obtain a first fusion feature of each instance candidate region; and performing instance segmentation based on each first fusion feature, to obtain at least one of an instance segmentation result of the corresponding instance candidate region or an instance segmentation result of the image.

According to an aspect of embodiments of the present disclosure, an instance segmentation apparatus is provided, including: a memory storing processor-executable instructions; and a processor arranged to execute the stored processor-executable instructions to perform operations of: performing feature extraction on an image to output features at at least two different hierarchies; extracting region features corresponding to at least one instance candidate region in the image from the features at the at least two different hierarchies; fusing region features corresponding to a same instance candidate region, to obtain a first fusion feature of each instance candidate region; and performing instance segmentation based on each first fusion feature, to obtain at least one of an instance segmentation result of the corresponding instance candidate region or an instance segmentation result of the image.

According to a further aspect of the embodiments of the present application, a non-transitory computer-readable storage medium is provided. The computer-readable storage medium having stored thereon computer-readable instructions that, when executed by a processor, cause the processor to perform an instance segmentation method, the method including: performing feature extraction on an image via a neural network to output features at at least two different hierarchies; extracting region features corresponding to at least one instance candidate region in the image from the features at the at least two different hierarchies, and fusing region features corresponding to a same instance candidate region, to obtain a first fusion feature of each instance candidate region; and performing instance segmentation based on each first fusion feature, to obtain at least one of an instance segmentation result of a corresponding instance candidate region or an instance segmentation result of the image.

By means of the accompanying drawings and embodiments, the technical solutions of the present disclosure are further described in details.

BRIEF DESCRIPTION OF THE DRAWINGS

The drawings constituting a part of the specification describe embodiments of the present disclosure, and are used for explaining the principles of the present disclosure in combination of the description.

With reference to the accompanying drawings, according to the detailed description below, the present disclosure can be understood more clearly, where.

DETAILED DESCRIPTION OF THE PREFERRED EMBODIMENTS

Figure 1:
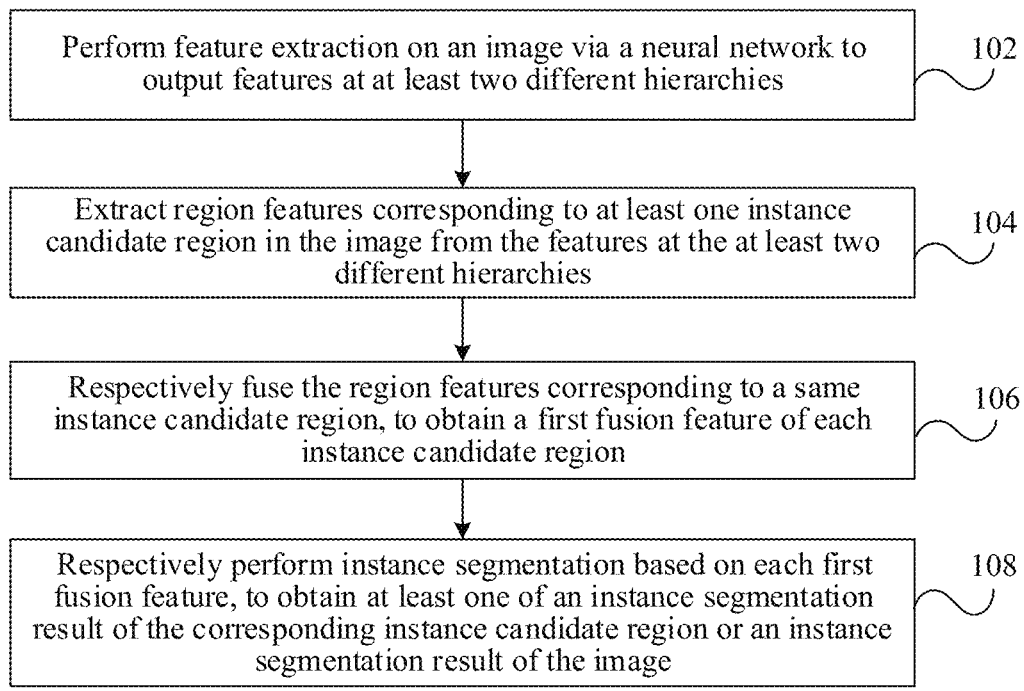
FIG. 1 is a flow chart of an embodiment of an instance segmentation method of the present disclosure.

Each exemplary embodiment of the present disclosure is described in detail with reference to the accompany drawings now. It should be noted that: unless otherwise stated specifically, relative arrangement of the components and steps, the numerical expressions, and the values set forth in the embodiments are not intended to limit the scope of the present disclosure.

It should be further understood that in the embodiments of the present disclosure, "a plurality of" may refer to two or more, and "at least one" may refer to one, two, or more.

Persons skilled in the art may understand that terms "first", "second", etc. in the embodiments of the present disclosure are only used for distinguishing different steps, devices, or modules, and do not represent any special technical meanings, and likewise do not represent necessary logic orders therebetween.

It should be further understood that any component, data, or structure mentioned in the embodiments of the present disclosure should be generally understood as one or more under the condition that no explicit definition is provided or no opposite motivation is provided in the context.

It should be further understood that the description of each embodiment of the present disclosure emphasizes differences between the embodiments, and the same or similar points therebetween may be used as reference and omitted for clarity.

In addition, it should be understood that, for ease of description, the size of each part shown in the accompanying drawings is not drawn in actual proportion.

The following descriptions of at least one exemplary embodiment are merely illustrative actually, and are not intended to limit the present disclosure and the applications or uses thereof.

Technologies, methods and devices known to a person of ordinary skill in the related art may not be discussed in detail, but such technologies, methods and devices should be considered as a part of the specification in appropriate situations.

It should be noted that similar reference numerals and letters in the following accompanying drawings represent similar items. Therefore, once an item is defined in an accompanying drawing, the item does not need to be further discussed in the subsequent accompanying drawings.

In addition, the term "and/or" in the present disclosure only describes an association relation between associated objects, indicating that three relations may exist, for example, A and/or B may indicate three conditions, i.e., A exists separately, A and B exist at the same time, and B exists separately. In addition, the character "/" in the present disclosure generally represents the preceding and latter associated objects are in an "or" relation.

The embodiments of the present disclosure may be applied to electronic devices such as terminal devices, computer systems, servers, which may operate with numerous other general-purpose or special-purpose computing system environments or configurations. Examples of well-known computing systems, environments, and/or configurations suitable for use together with the computer systems/servers include, but are not limited to, personal computer systems, server computer systems, thin clients, thick clients, handheld or laptop devices, microprocessor-based systems, set top boxes, programmable consumer electronics, network personal computers, small computer systems, large computer systems, distributed cloud computing environments that include any one of the foregoing systems.

The electronic devices such as terminal devices, computer systems, and servers may be described in the general context of computer system executable instructions (for example, program modules) executed by the computer system. Generally, the program modules may include routines, programs, target programs, components, logics, and data structures, to execute specific tasks or implement specific abstract data types. The computer systems/servers may be practiced in the distributed cloud computing environments in which tasks are executed by remote processing devices that are linked through a communications network. In the distributed computing environments, program modules may be located in local or remote computing system storage media including storage devices.

FIG. 1 is a flow chart of an embodiment of an instance segmentation method of the present disclosure. As shown in FIG. 1, the instance segmentation method of the embodiment includes operations 102 to 108.

In operation 102, feature extraction is performed on an image via a neural network to output features at at least two different hierarchies.

Representing forms of the features in the embodiments of the disclosure may include, but not limited to, for instance: a feature diagram, a feature vector, a feature matrix, etc. The at least two different hierarchies refer to two or more network layers located at different depth of the neural network in the neural network. The image may include, but not limited to, for instance: a static image, a frame image in a video, etc.

In an optional example, operation 102 may be executed by invoking, by a processor, corresponding instructions stored in a memory, and may also be executed by the neural network run by the processor.

In operation 104, region features corresponding to at least one instance candidate region in the image are extracted from the features at the at least two different hierarchies.

The instance may include, but not limited to, for example, a certain specific object, for example, a certain specific person, a certain specific article, etc. One or more instance candidate regions may be obtained by detecting the image via the neural network. The instance candidate region represents a region in the image where the instance may appear.

In an optional example, operation 104 may be executed by a processor by invoking a corresponding instruction stored in a memory, or may be executed by an extraction module run by the processor.

In operation 106, region features corresponding to a same instance candidate region is respectively fused, to obtain a first fusion feature of each instance candidate region.

In embodiments of the preset disclosure, the mode for fusing multiple region features may be, for example, element-wise summing, element-wise max, element-wise averaging, etc.

In an optional example, the operation 106 is performed by a processor by invoking a corresponding instruction stored in a memory, or is performed by a first fusion module run by the processor.

In operation 108, instance segmentation is respectively performed based on each first fusion feature, to obtain at least one of an instance segmentation result of the corresponding instance candidate region or an instance segmentation result of the image.

In the embodiments of the present disclosure, the instance segmentation result of the instance candidate region may include: elements belonging to a certain instance in the instance candidate region and the class to which the instance belongs, for example, the element belongs to a certain boy in the instance candidate region and the class to which the boy belongs is human.

In an optional example, operation 108 may be executed by a processor by invoking a corresponding instruction stored in a memory, or may be executed by a segmentation module run by the processor.

Based on the instance segmentation methods provided by the embodiments of the present disclosure, the method includes: performing feature extraction on an image via a neural network to output features at at least two different hierarchies; extracting region features corresponding to at least one instance candidate region in the image from the features at the two different hierarchies, and fusing region features corresponding to a same instance candidate region, to obtain a first fusion feature of each instance candidate region; and performing instance segmentation based on each first fusion feature, to obtain at least one of an instance segmentation result of the corresponding instance candidate region or an instance segmentation result of the image. Embodiments of the present disclosure design solving the problem of instance segmentation based on a deep-learning framework; since the deep-learning has a strong modeling capability, it facilitates to obtain a better instance segmentation result. In addition, performing instance segmentation on the instance candidate region, with respect to directly performing instance segmentation on an entire image, can improve accuracy of instance segmentation, reduce the computing amount and complexity required for the instance segmentation, and improve the instance segmentation efficiency. Moreover, extracting region features corresponding to the instance candidate region from the features at the at least two different hierarchies for fusing and performing the instance segmentation based on the obtained fusion feature enable each instance candidate region to obtain information at different hierarchies at the same time; since the information extracted from the features at different hierarchies are all at different semantic hierarchies, accuracy of the instance segmentation result of each instance candidate region can be improved via context information.

In an embodiment of the instance segmentation method embodiments of the present disclosure, operation 102 of the performing feature extraction on the image via the neural network to output the features at the at least two different hierarchies may include: performing feature extraction on the image via the neural network to output the features at the at least two different hierarchies by means of at least two network layers with different network depths in the neural network.

In the embodiments of the present disclosure, the neural network includes two or more network layers with different network depths; in the network layers included by the neural network, the network layer used for feature extraction may be referred to as a feature layer; after receiving an image by the neural network, feature extraction is performed on the input image by means of a first network layer and the extracted feature is input to a second network layer; starting from the second network layer, feature extraction is performed on the input feature on each network layer in sequence, and the extracted feature is input to a next network layer for feature extraction. The network depth of each network layer in the neural network is from shallow to deep in an order of input and output or in an order of feature extraction; the hierarchies for the features output after feature extraction on each network layer in sequence is from low to high, and resolution ratios thereof are from high to low. As compared with the network layer with a shallower network depth in the same neural network, the network layer with a deeper network depth has a wider vision domain and more structural information of a concerned space, and when the extracted feature is used for instance segmentation, the segmentation result may be more accurate. In the neural network, the network layer generally may include: at least one convolutional layer for feature extraction and an upsampling layer for upsampling the feature extracted from the convolutional layer (e.g., a feature diagram); by upsampling the feature, the size of the feature extracted from the convolutional layer (e.g., the feature diagram) may be reduced.

In an embodiment of the instance segmentation method embodiments of the present disclosure, operation 106 of the respectively fusing region features corresponding to a same instance candidate region may include: respectively perform pixel-level fusion on a plurality of region features corresponding to the same instance candidate region.

For example, in an optional example, the respectively performing pixel-level fusion on a plurality of region features corresponding to the same instance candidate region may be:

respectively performing element-wise max on the plurality of region features corresponding to the same instance candidate region, i.e., taking the maximum value of the features of the element positions in the plurality of region features corresponding to the same instance candidate region;

or respectively performing element-wise averaging on the plurality of region features corresponding to the same instance candidate region, i.e., taking the averaging value of the features of the element positions in the plurality of region features corresponding to the same instance candidate region;

or respectively performing element-wise summing on the plurality of region features corresponding to the same instance candidate region, i.e., taking the summing value of the features of the element positions in the plurality of region features corresponding to the same instance candidate region.

In the embodiments, when performing pixel-level fusion on the plurality of region features corresponding to the same instance candidate region, as compared with other approaches, the approach of performing element-wise max on the plurality of region features corresponding to the same instance candidate region enables the feature of the instance candidate region more obvious, so that the instance segmentation is more accurate, so as to improve the accuracy of the instance segmentation result.

Optionally, in another embodiment of the instance segmentation method of the present disclosure, before respectively fusing the region features corresponding to the same instance candidate region, the region features corresponding to the same instance candidate region may be adjusted by means of a network layer, for example, a fully convolutional layer or a full connection layer, for example, adjusting a dimension of each region feature corresponding to the same instance candidate region that participates in fusion, and adapting each region feature corresponding to the same instance candidate region that participates in fusion, so that each region feature corresponding to the same instance candidate region that participates in fusion is more suitable for fusion, thereby obtaining a more accurate fusion feature.

In another embodiment of the instance segmentation method of the present disclosure, operation 102, after outputting features at the at least two different hierarchies, may further include, performing at least one retracing fusion on the features at the at least two different hierarchies to obtain a second fusion feature. The one retracing fusion includes: fusing the features at different hierarchies output by the network layers with different network depths respectively based on a network depth direction of the neural network according to two different hierarchy directions in sequence. Accordingly, in this embodiment, operation 104 may include: extracting the region features corresponding to the at least one instance candidate region from the second fusion feature.

In an embodiment of the embodiments above, the two different hierarchy directions include: a direction from high hierarchy features to low hierarchy features and a direction from the low hierarchy features to the high hierarchy features. Hence, context information is better used for feature fusion, thereby improving the instance segmentation result of each instance candidate region.

In an optional example, the according to the two different hierarchy directions in sequence may include: along the direction from the high hierarchy features to the low hierarchy features (a direction from the feature output by the network layer with a deeper network depth to the feature output by the network layer with a shallower network depth in the neural network) and the direction from the low hierarchy features to the high hierarchy features in sequence (a direction from the feature output by the network layer with a shallower network depth to the feature output by the network layer with a deeper network depth in the neural network); or along the direction from the low hierarchy features to the high hierarchy features and the direction from the high hierarchy features to the low hierarchy features in sequence.

In one of the embodiments of the present disclosure, the fusing the features at the different hierarchies output by the network layers with the different network depths respectively along the direction from the high hierarchy features to the low hierarchy features and the direction from the low hierarchy features to the high hierarchy features in sequence includes:

along a direction from deep to shallow of the network depth of the neural network, after upsampling features at a higher hierarchy output by a network layer with a deeper network depth in the neural network in sequence, fusing the upsampled features with features at a lower hierarchy output by a network layer with a shallower network depth, for example, after upsampling the features at a higher hierarchy, fusing the upsampled features with features at a lower hierarchy, to obtain a third fusion feature. The features at a higher hierarchy may include: features output by the network layer with a deeper network depth in the neural network or features obtained by performing at least one feature extraction on the features output by the network layer with the deeper network depth. For example, in the feature participating in fusion, the features at the highest hierarchy may be the features at the highest hierarchy in the features at the at least two different hierarchies, or may also be features obtained by performing one or more feature extractions on the features at the highest hierarchy; the third fusion feature may include the features at the highest hierarchy and the fusion feature obtained from each fusion.

Along the direction from the low hierarchy features to the high hierarchy features, after downsampling fusion features at a lower hierarchy in sequence, the downsampled fusion features is fused with fusion features at a higher hierarchy in the third fusion feature. In the fusion feature participating in this fusion, the features at the lowest hierarchy may be the fusion features at the lowest hierarchy in the third fusion features, or may also be features obtained by performing one or more feature extractions on the fusion features at the lowest hierarchy in the third fusion feature; the batch of fusion features obtained by means of feature fusion along the direction from the low hierarchy feature to the high hierarchy feature include the fusion features at the lowest hierarchy in the third fusion feature and the fusion feature obtained from each fusion.

If one retracing fusion is performed on the features at the at least two different hierarchies, the batch of fusion features obtained by means of feature fusion along the direction from the low hierarchy feature to the high hierarchy feature is the second fusion feature; if two or more retracing fusions are performed on the features at the at least two different hierarchies, an operation for fusion along the direction from the high hierarchy features to the low hierarchy features and along the direction from the low hierarchy features to the high hierarchy features can be performed for multiple times, to finally obtain a batch of fusion features, i.e., the second fusion feature.

After upsampling the features at the higher hierarchy output by the network layer with a deeper network depth, when fusing with the upsampled features with the feature at the lower hierarchy output by the network layer with a shallower network depth, after upsampling the features at the higher hierarchy output by the network layer with a deeper network depth (for example, an 80-th network layer along input and output directions of the neural network) in the neural network, the upsampled features can be in sequence fused with the feature at the lower hierarchy output by an adjacent network layer with a shallower network depth (for example, a 79-th network layer along input and output directions of the neural network). In addition, after upsampling the features at the higher hierarchy output by the network layer with the deeper network depth (for example, the 80-th network layer along input and output directions of the neural network) in the neural network, the upsampled features can be in sequence fused with the feature at the lower hierarchy output by a network layer with a shallower network depth which is not adjacent to the network layer with the deeper network depth (for example, a 50-th network layer along input and output directions of the neural network), i.e., performing over-hierarchy feature fusion.

Similarly, after downsampling the fusion features at a lower hierarchy, when the downsampled features are fused with the fusion features at the higher hierarchy in the third fusion feature, after downsampling the fusion features (e.g., $P_2$, where "2" represents the feature hierarchy) at the lower hierarchy, the downsampled features can also be fused with the adjacent fusion features at the higher hierarchy in the third fusion feature (e.g., $P_3$, where "3" represents the feature hierarchy). Or after downsampling the fusion features at the lower hierarchy, the downsampled features can be fused with the fusion feature at the higher hierarchy in the third fusion feature which is not adjacent to the feature hierarchy (e.g., $P_4$, where "4" represents the feature hierarchy), i.e., performing over-hierarchy fusion feature fusion.

Figure 2:
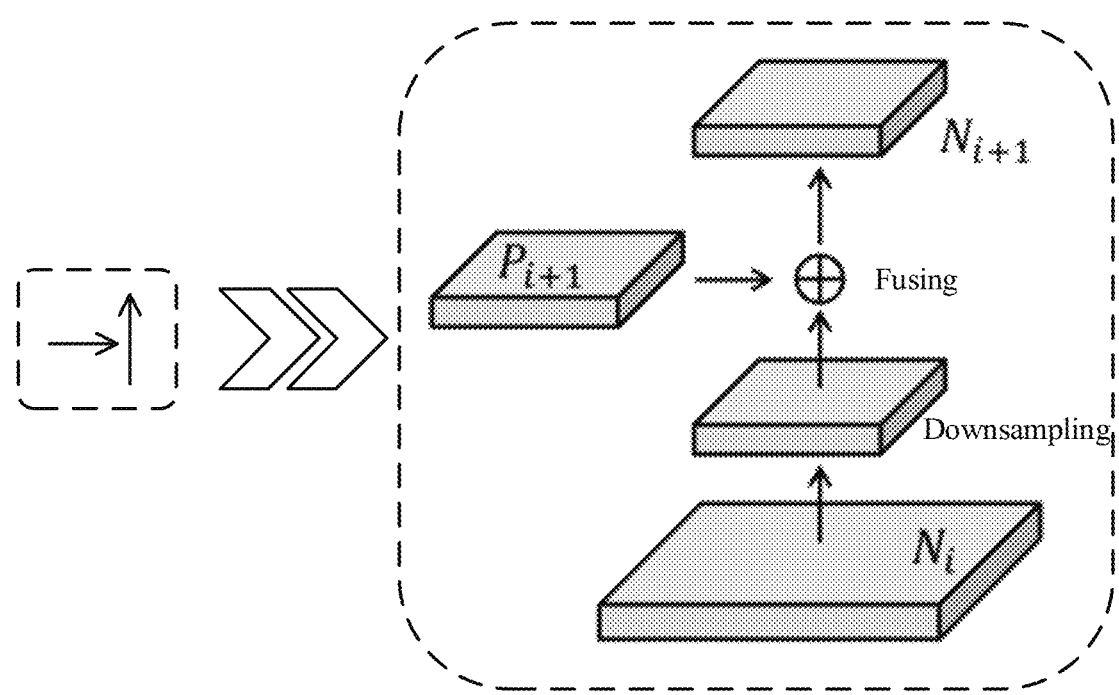
FIG. 2 is a feature fusion schematic diagram in embodiments of the present disclosure.

FIG. 2 is a feature fusion schematic diagram in embodiments of the present disclosure. As shown in FIG. 2, a schematic diagram of after downsampling the fusion feature $N_i$ at the lower hierarchy, fusing the downsampled feature $N_i$ with the adjacent feature $P_{i-1}$ at the higher hierarchy to obtain a corresponding fusion feature $N_{i+1}$ is shown, where i is an integer with a value greater than 0.

Based on the embodiment, according to an order from top to bottom (i.e., an order from deep to shallow network depths in the neural network and from high hierarchy features to low hierarchy feature), the features at the high hierarchy and with low resolution ratio are gradually fused with the features at the low hierarchy and with high resolution ratio to obtain a new batch of features; then according to an order from bottom to top (i.e., an order from the low hierarchy features to the high hierarchy features), after downsampling the fusion feature at the lower hierarchy in sequence, the downsampled feature fusions are fused with adjacent features at the higher hierarchy, and the features at the low hierarchy and with high resolution ratio are gradually fused with the features at the high hierarchy and with low resolution ratio to obtain another new batch of features for instance segmentation. In this embodiment, an information path from bottom to top can help low hierarchy information be broadcasted to a high hierarchy network (i.e., the network layer with a deeper network depth) more easily, and reduce loss of information broadcasting, so that information can be more smoothly transferred inside the neural network; since the low hierarchy information is more sensitive for certain details, it can provide information beneficial to positioning and segmentation, thereby improving the instance segmentation result; by two feature fusions, the high hierarchy network (i.e., the network layer with a deeper network depth) is enabled to obtain the bottom hierarchy information more easily and completely, thereby further improving the instance segmentation result.

In another embodiment of the embodiments of the present disclosure, the fusing the features at the different hierarchies output by the network layers with different network depths respectively along the direction from the low hierarchy features to the high hierarchy features and the direction from the high hierarchy features to the low hierarchy features in sequence includes:

along a direction from shallow to deep of the network depth of the neural network, after downsampling features at a lower hierarchy output by a network layer with a shallower network depth in the neural network in sequence, fusing the downsampled features with features at a higher hierarchy output by a network layer with a deeper network depth, to obtain a fourth fusion feature, where the features at a lower hierarchy, for example, may include: features output by the network layer with a shallower network depth in the neural network or features obtained by performing at least one feature extraction on the features output by the network layer with the shallower network depth. For example, in the feature participating in fusion, the features at the lowest hierarchy may be the features at the lowest hierarchy in the features at the at least two different hierarchies, or may also be features obtained by performing one or more feature extractions on the features at the lowest hierarchy; the fourth fusion feature may include the features at the lowest hierarchy and the fusion feature obtained from each fusion.

Along the direction from the high hierarchy features to the low hierarchy features, after upsampling fusion features at a higher hierarchy in sequence, the upsampled fusion features is fused with fusion features at a lower hierarchy in the fourth fusion feature. In the fusion feature participating in this fusion, the features at the highest hierarchy may be the fusion features at the highest hierarchy in the fourth fusion features, or may also be features obtained by performing one or more feature extractions on the fusion features at the highest hierarchy in the fourth fusion feature; in the batch of fusion features obtained by means of feature fusion along the direction from the low hierarchy feature to the high hierarchy feature and the direction from the high hierarchy feature to the low hierarchy feature include the fusion features at the highest hierarchy in the fourth fusion feature and the fusion feature obtained from each fusion.

If one retracing fusion is performed on the features at the at least two different hierarchies, the batch of fusion features obtained by means of feature fusion along the direction from the low hierarchy feature to the high hierarchy feature and the direction from the high hierarchy feature to the low hierarchy feature is the second fusion feature; if two or more retracing fusions are performed on the features at the at least two different hierarchies, an operation for fusion along the direction from the low hierarchy features to the high hierarchy features and along the direction from the high hierarchy features to the low hierarchy features can be performed for multiple times, to finally obtain a batch of fusion features, i.e., the second fusion feature.

In an optional example, in the neural network, after downsampling features at the lower hierarchy output by the network layer with the shallower network depth, when fusing the downsampled features with the features at the higher hierarchy output by the network layer with the deeper network depth, after downsampling the features at the lower hierarchy output by the network layer with the shallower network depth in the neural network, the downsampled features can be fused with features at the higher hierarchy output by the network layer with the deeper network depth adjacent to the network layer with a shallower network depth. Or, after downsampling the features at the lower hierarchy output by the network layer with the shallower network depth in the neural network, the downsampled features can also be fused with the feature at the higher hierarchy output by a network layer with a deeper network depth which is not adjacent to the network layer with the shallower network depth, i.e., performing over-hierarchy feature fusion.

Similarly, after upsampling fusion features at the higher hierarchy, when fusing the upsampled fusion features with the fusion features at the lower hierarchy in the fourth fusion feature, after upsampling the fusion features at the higher hierarchy, the upsampled fusion features can also be fused with adjacent fusion features at the lower hierarchy in the fourth fusion feature. Or after upsampling the fusion features at the higher hierarchy, the upsampled features can also be fused with the fusion feature at the lower hierarchy in the fourth fusion feature which is not adjacent, i.e., performing over-hierarchy fusion feature fusion.

In one of the embodiments of the present disclosure, in operation 108, the performing the instance segmentation based on each first fusion feature, to obtain at least one of the instance segmentation result of the corresponding instance candidate region or the instance segmentation result of the image may include:

based on a first fusion feature, performing instance segmentation on the instance candidate region corresponding to the first fusion feature, to obtain the instance segmentation result of the corresponding instance candidate region, where the first fusion feature is not limited to a specific first fusion feature, and may be a first fusion feature of any instance candidate region; and/or based on each first fusion feature, performing instance segmentation on the image, to obtain the instance segmentation result of the image.

In another embodiment of the embodiments of the present disclosure, in operation 108, the based on the each first fusion feature, performing the instance segmentation to obtain the instance segmentation result of the image may include: respectively performing the instance segmentation on the instance candidate region corresponding to the each first fusion feature based on the each first fusion feature, to obtain the instance segmentation result of each instance candidate region; and obtaining the instance segmentation result of the image based on the instance segmentation result of the each instance candidate region.

Figure 3:
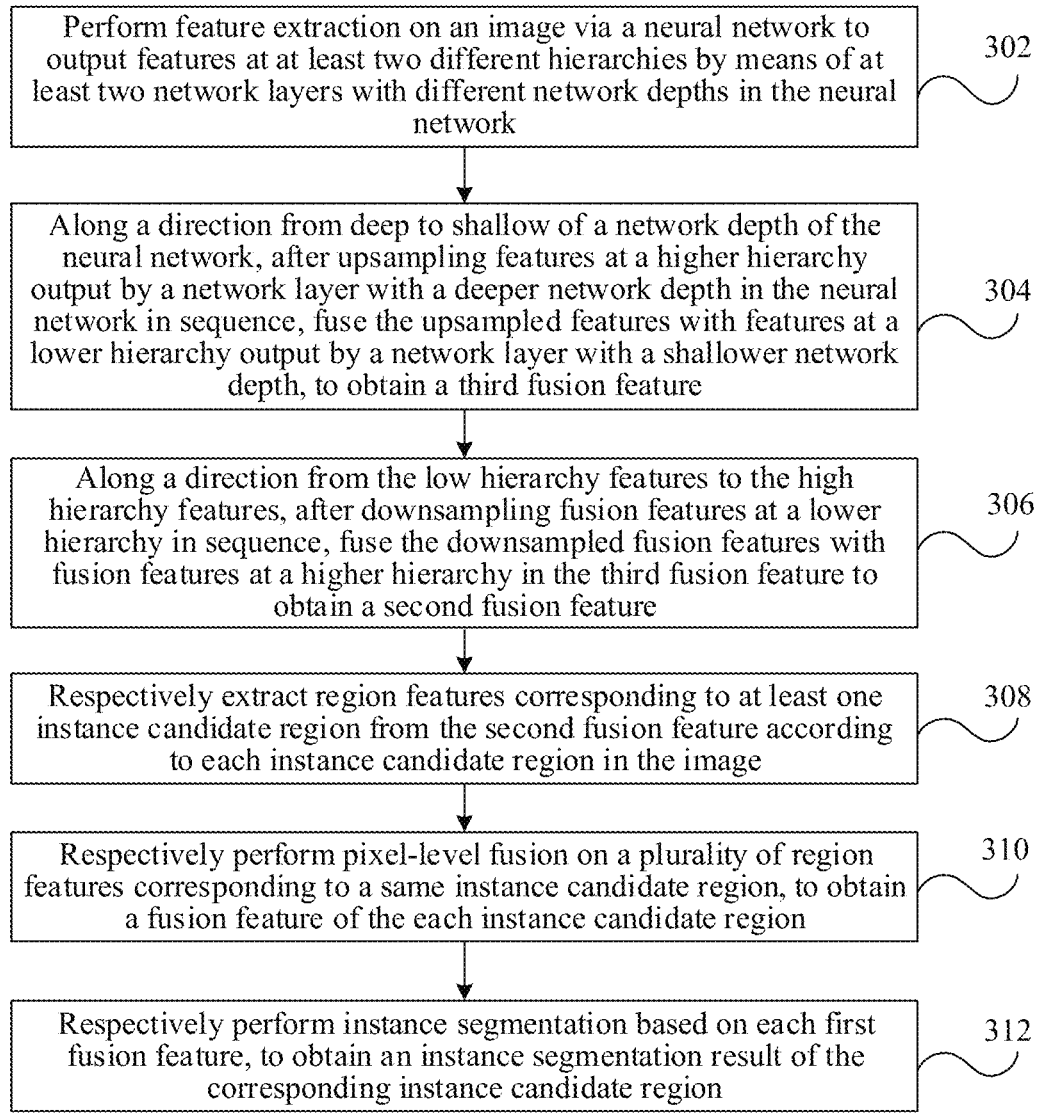
FIG. 3 is a flow chart of another embodiment of the instance segmentation method of the present disclosure.

FIG. 3 is a flow chart of another embodiment of the instance segmentation method of the present disclosure. As shown in FIG. 3, the instance segmentation method of the embodiment includes operations 302 to 312.

In operation 302, feature extraction is performed on an image via a neural network to output features at the at least two different hierarchies by means of the network layers with the at least two different network depth in the neural network.

In an optional instance, operation 302 may be executed by invoking, by a processor, corresponding instructions stored in a memory, and may also be executed by the neural network run by the processor.

In operation 304, along a direction from deep to shallow of the network depth of the neural network, after upsampling features at a higher hierarchy output by a network layer with a deeper network depth in the neural network in sequence, the upsampled features are fused with features at a lower hierarchy output by a network layer with a shallower network depth, to obtain a third fusion feature.

The features at a higher hierarchy may include: features output by the network layer with a deeper network depth in the neural network or features obtained by performing at least one feature extraction on the features output by the network layer with the deeper network depth. For example, in the feature participating in fusion, the features at the highest hierarchy may be the features at the highest hierarchy in the features at the at least two different hierarchies, or may also be features obtained by performing one or more feature extractions on the features at the highest hierarchy; the third fusion feature may include the features at the highest hierarchy in the features at the at least two different hierarchies and the fusion feature obtained from each fusion in operation 304.

In operation 306, along a direction from the low hierarchy features to the high hierarchy features, after downsampling fusion features at a lower hierarchy in sequence, the downsampled fusion features is fused with fusion features at a higher hierarchy in the third fusion feature, to obtain the second fusion feature.

In the fusion feature participating in this fusion, the features at the lowest hierarchy may be the fusion features at the lowest hierarchy in the third fusion features, or may also be features obtained by performing one or more feature extractions on the fusion features at the lowest hierarchy in the third fusion feature; the batch of fusion features obtained by means of feature fusion along the direction from the low hierarchy feature to the high hierarchy feature include the fusion features at the lowest hierarchy in the third fusion feature and the fusion feature obtained from each fusion by means of a fusion operation in operation 306.

This embodiment is explained using one retracing fusion as an example: if the features at the at least two different hierarchies are subjected to two or more retracing fusions, operations 304-306 are executed for multiple times, and the batch of fusion features obtained finally is the second fusion feature.

In an optional instance, the operations 304-306 is performed by a processor by invoking a corresponding instruction stored in a memory, or is performed by a second fusion module run by the processor.

In operation 308, the region features corresponding to the at least one instance candidate region are extracted from the second fusion feature respectively according to each instance candidate region in the image.

In the embodiments of the present disclosure, for example, it may adopt, but not limited to, Region Proposal Network (RPN) to generate each instance candidate region for the image, and to map each instance candidate region on the features in the second fusion region; then for example, it may adopt, but not limited to, a method of Region Of Interest Alignment (ROIAlign) to extract the region features corresponding to each instance candidate region from the second fusion region.

In an optional instance, operation 308 may be executed by a processor by invoking a corresponding instruction stored in a memory, or may be executed by an extraction module run by the processor.

In operation 310, pixel-level fusion is respectively performed on the plurality of region features corresponding to the same instance candidate region, to obtain a fusion feature of each instance candidate region.

In an optional instance, the operation 310 is performed by a processor by invoking a corresponding instruction stored in a memory, or is performed by a first fusion module run by the processor.

In operation 312, instance segmentation is performed respectively based on each first fusion feature, to obtain the instance segmentation result of the corresponding instance candidate region.

In an optional example, operation 312 may be executed by a processor by invoking a corresponding instruction stored in a memory, or may be executed by a segmentation module run by the processor.

In an embodiment of each instance segmentation method embodiment of the present disclosure, based on a first fusion feature, performing instance segmentation on the instance candidate region corresponding to the first fusion feature, to obtain the instance segmentation result of the corresponding instance candidate region may include:

based on the first fusion feature, performing pixel-level example class prediction, to obtain an example class prediction result of the example candidate region corresponding to the first fusion feature; based on the first fusion feature, performing pixel-level foreground and background prediction, to obtain a foreground and background prediction result of the example candidate region corresponding to the first fusion feature, where the first fusion feature is a first fusion feature of any instance candidate region;

based on the instance class prediction result and the foreground and background prediction result, obtaining the instance segmentation result of the instance candidate region corresponding to the first fusion feature, where the instance segmentation result includes: an element belonging to a certain instance in the current instance candidate region and class information to which the instance belongs.

Based on this embodiment, based on the first fusion feature, pixel-level instance class prediction and foreground and background prediction are performed at the same time; the pixel-level instance class prediction can perform fine classification and multiple classification on the first fusion feature; better global information can be obtained by means of the foreground and background prediction; since detailed information between multiple instance classes is not required to be concerted, a prediction speed is improved; meanwhile, obtaining the example segmentation result of the instance candidate region based on the instance class prediction result and the foreground and background prediction result can improve the instance segmentation result of the instance candidate region or image.

In an optional example, based on the first fusion feature, performing pixel-level instance class prediction may include:

performing feature extraction on the first fusion feature by means of a first convolutional network, the first convolutional network including at least one fully convolutional layer; and performing pixel-level object class prediction by means of a first fully convolutional layer based on a feature output by the first convolutional network.

In an optional example, based on the first fusion feature, performing pixel-level foreground and background prediction includes:

based on the first fusion feature, predicting elements belonging to the foreground and/or elements belonging to the background in the instance candidate region corresponding to the first fusion feature, where the background and foreground can be set according to requirements. For example, the foreground may include portions corresponding to all instance classes, and the background may include portions other than the portions corresponding to all instance classes; or the background may include portions corresponding to all instance classes, and the foreground may include portions other than the portions corresponding to all instance classes.

In another optional example, based on the first fusion feature, performing pixel-level foreground and background prediction may include:

performing feature extraction on the first fusion feature by means of a second convolutional network, the second convolutional network including at least one fully convolutional layer; and performing pixel-level foreground and background prediction by means of a full connection layer based on a feature output by the second convolutional network.

In an embodiment of the instance segmentation method embodiments of the present disclosure, based on the instance class prediction result and the foreground and background prediction result, obtaining the instance segmentation result of the instance candidate region corresponding to the first fusion feature includes:

performing pixel-level summing on the object class prediction result of the instance candidate region corresponding to the first fusion feature and the foreground and background prediction result of the instance candidate region corresponding to the first fusion feature, to obtain the instance segmentation result of the instance candidate region corresponding to the first fusion feature.

In another embodiment approach, after obtaining the foreground and background prediction result of the instance candidate region corresponding to the first fusion feature, it may further include: reshaping the foreground and background prediction result into a foreground and background prediction result with a dimension consistent with that of the instance class prediction result. For example, the foreground and background prediction result is reshaped from a vector to a matrix having consistent dimension with the object class prediction. Accordingly, the performing pixel-level summing on the object class prediction result of the instance candidate region corresponding to the first fusion feature and the foreground and background prediction result of the instance candidate region corresponding to the first fusion feature may include: performing pixel-level summing on the instance class prediction result of the instance candidate region corresponding to the first fusion feature and the reshaped foreground and background prediction result of the instance candidate region corresponding to the first fusion feature.

Figure 4:
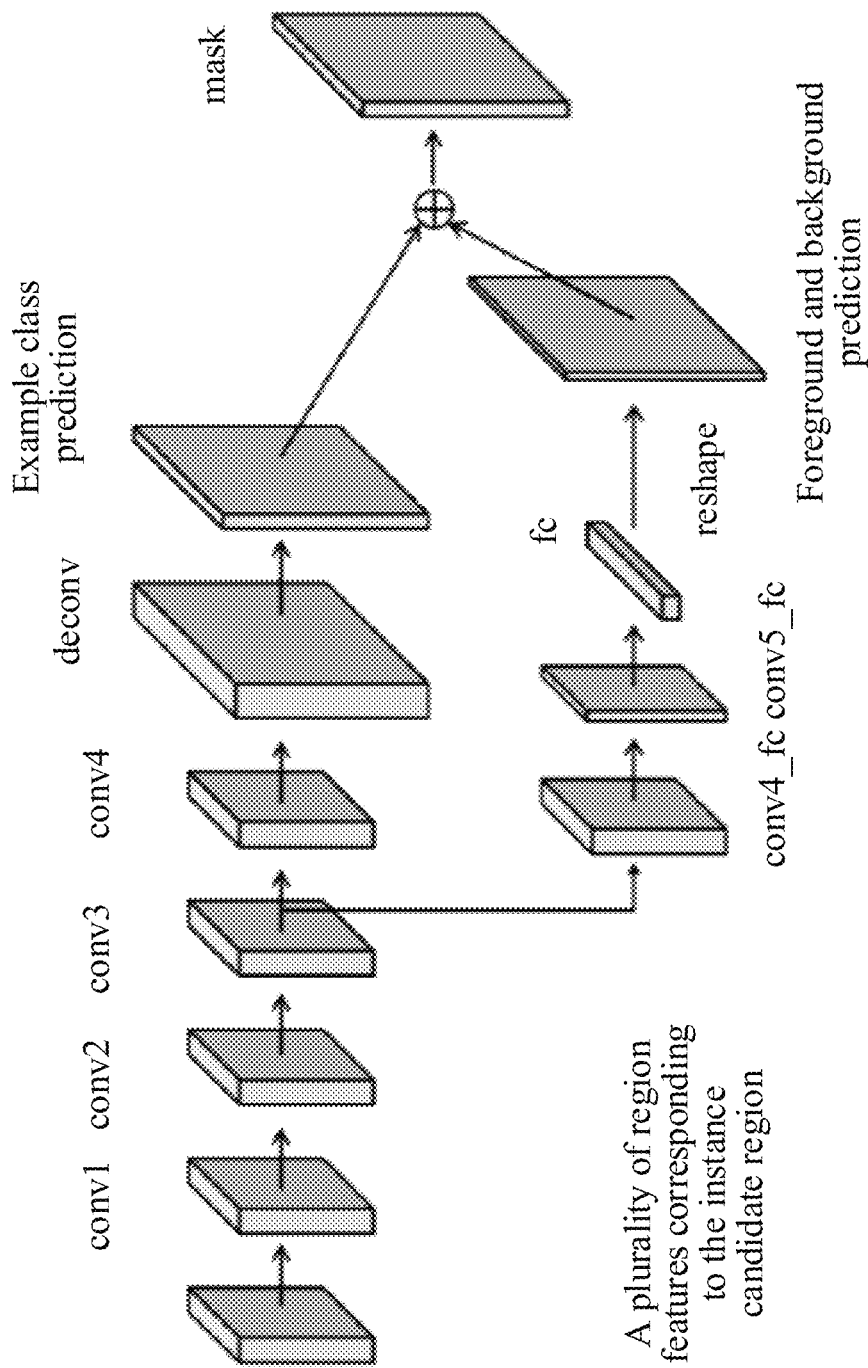
FIG. 4 is a network structure schematic diagram for two-path mask prediction executed in embodiments of the present disclosure.

In the embodiment of the embodiments of the present disclosure, when instance segmentation is performed respectively based on the first fusion feature of each instance candidate region, to obtain the instance segmentation result of each instance candidate region, since the pixel-level instance class prediction and foreground and background prediction based on the first fusion feature of the instance candidate region at the same time, the part of solution may be referred to as a double-path mask prediction; as shown in FIG. 4, it is a network structure schematic diagram of the double-path mask prediction executed in the embodiment of the present disclosure.

As shown in FIG. 4, the multiple region features corresponding to the instance candidate region are subjected to instance class prediction and foreground and background prediction by means of two branches. The first branch includes: four fully convolutional layers (conv1-conv4), i.e., the first convolution network and a deconvolutional layer (deconv), i.e., the first fully convolutional layer. The other branch includes: a third fully convolutional layer and a fourth convolutional layer (conv3 and conv4) from the first branch, and two fully convolutional layers (conv4-$fc$ and conv5-$fc$), i.e., the second convolution network; a full connection layer (fc); and a reshaping layer, used for reshaping the foreground and background prediction result into a foreground and background prediction result having a consistent dimension with the instance class prediction result. The pixel-level mask prediction is performed by the first branch on each potential instant class, while the full connection layer performs the mask prediction irrelevant to the instance class (i.e., performing pixel-level foreground and background prediction). Finally, the mask predictions of the two branches are summed to obtain the final instance segmentation result.

Figure 5:
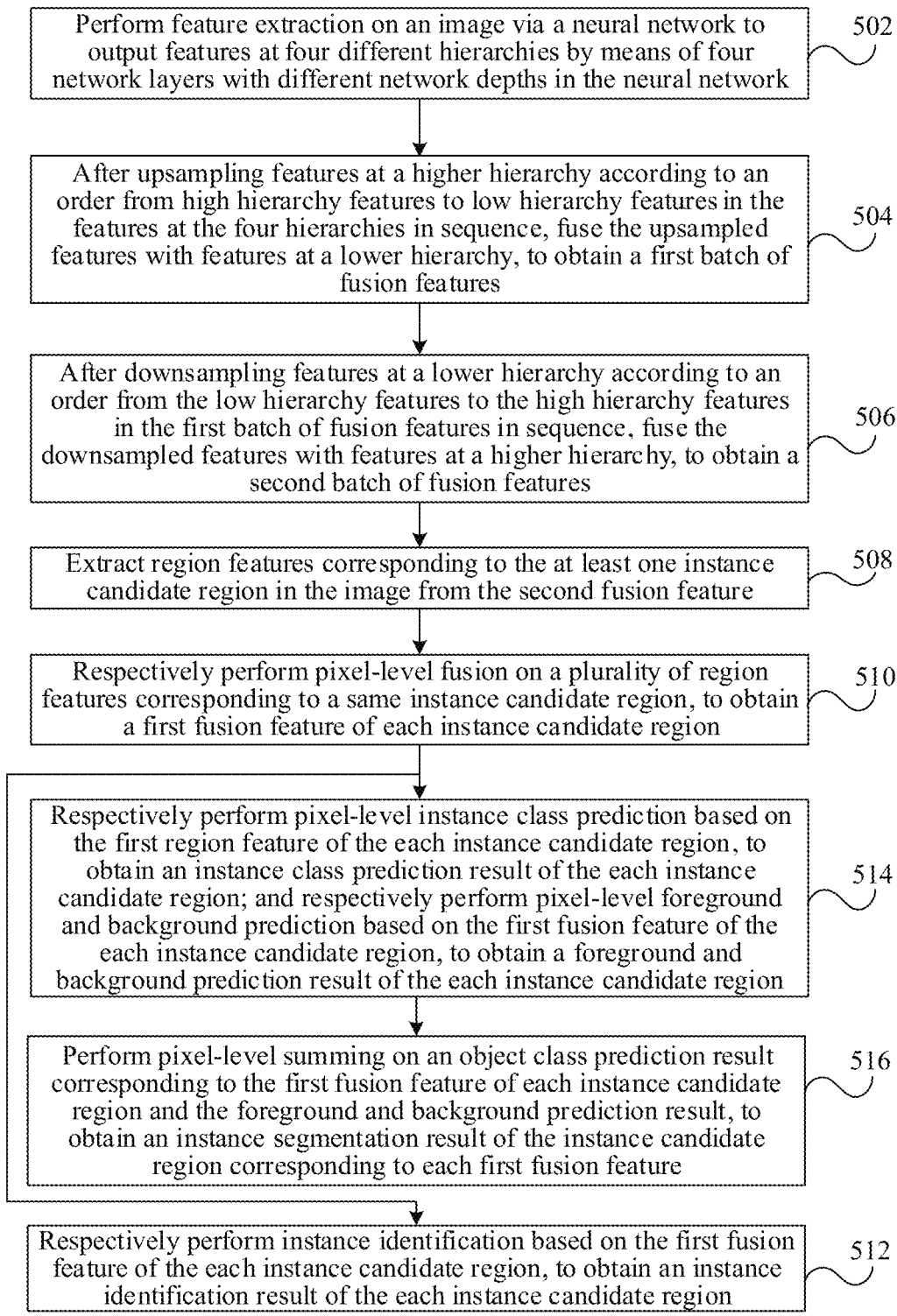
FIG. 5 is a flow chart of an application embodiment of the instance segmentation method of the present disclosure.
Figure 6:
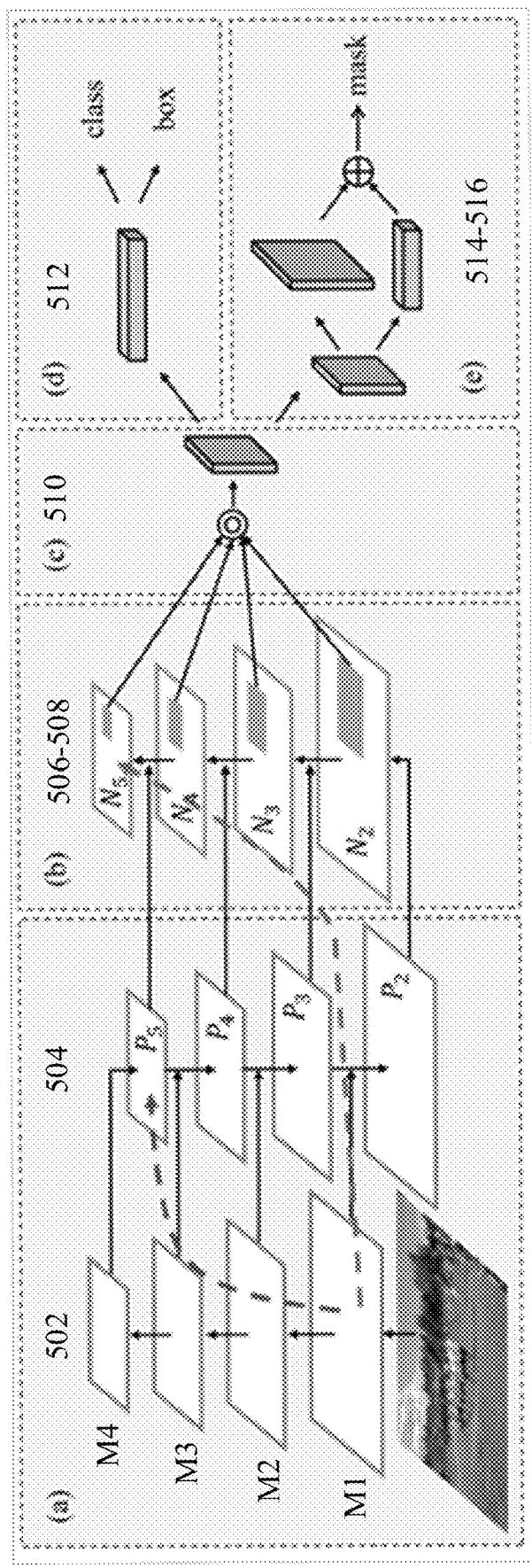
FIG. 6 is a process schematic diagram of the application embodiment shown in FIG. 5.

FIG. 5 is a flow chart of an application embodiment of the instance segmentation method of the present disclosure. FIG. 6 is a process schematic diagram of the application embodiment shown in FIG. 5. Referring to FIG. 5 and FIG. 6 at the same time, the instance segmentation method of the application embodiment includes operations 502 to 516.

In operation 502, feature extraction is performed on an image via a neural network to output features $M_1$-$M_4$ at four hierarchies output by the network layers with four different network depths in the neural network.

In an optional instance, operation 502 may be executed by invoking, by a processor, corresponding instructions stored in a memory, and may also be executed by the neural network run by the processor.

In operation 504, in the feature at the four hierarchies, after upsampling the feature $M_{i+1}$ at the higher hierarchy according to an order from the high hierarchy feature $M_4$ to the low hierarchy feature $M_1$ (i.e., from top to bottom) in sequence, the upsampled feature is fused with the feature $M_i$ at the lower hierarchy to obtain the first batch of fusion features $P_2$-$P_5$.

The values of i are integers in 1-3 in sequence. In the features participating in fusion and the first batch of fusion features, the fusion feature $P_5$ at the highest hierarchy is the feature $M_4$ at the highest hierarchy in the four different hierarchies or the feature obtained by performing feature extraction on the feature $M_4$ by means of the fully convolutional layer; the first fusion feature includes the fusion feature at the highest hierarchy in the features at four different hierarchies and fusion features $P_2$-$P_5$ obtained from each fusion.

In operation 506, in the first batch of fusion features, after downsampling the fusion feature $P_k$ at the lower hierarchy according to an order from the low hierarchy feature $P_2$ to the high hierarchy feature $P_5$ (i.e., from bottom to top) in sequence, the downsampled feature is fused with the feature $P_{k-1}$ at the adjacent higher hierarchy to obtain the second batch of fusion features $N_2$-$N_5$.

The values of k are integers in 2-4 in sequence. In the fusion feature participating in this fusion and the second batch of fusion features, the fusion feature $N_2$ at the lowest hierarchy is the fusion feature $P_2$ at the lowest hierarchy in the first batch of fusion features or the feature obtained by performing feature extraction on the fusion feature $P_2$ by means of the fully convolutional layer; the second batch of fusion features includes the feature corresponding to the feature $P_2$ at the lowest hierarchy in the first batch of fusion features and the fusion feature obtained from each fusion, wherein the feature corresponding to the feature at the lowest hierarchy in the first batch of fusion features is the fusion feature $P_2$ at the lowest hierarchy in the first batch of fusion features or the feature obtained by performing feature extraction on the fusion feature $P_2$ by means of the convolutional layer.

The present application embodiment takes performing one retracing fusion on the features $M_1$-$M_4$ at the four hierarchies as an example for explanation, and therefore, the second batch of fusion features obtained by means of operation 506 is the second fusion feature in each embodiment of the present disclosure.

In an optional instance, the operations 502-504 is performed by a processor by invoking a corresponding instruction stored in a memory, or is performed by a second fusion module run by the processor.

In operation 508, the region features corresponding to the at least one instance candidate region in the image is extracted from the second fusion features $N_2$-$N_5$.

In the embodiments of the present disclosure, for example, it may adopt, but not limited to, the RPN to generate at least one instance candidate region for the image, and to map each instance candidate region on the features in the second fusion region respectively; then for example, it may adopt, but not limited to, a method of ROIAlign to extract the region features corresponding to each instance candidate region from the second fusion region respectively.

In an optional instance, operation 508 may be executed by a processor by invoking a corresponding instruction stored in a memory, or may be executed by an extraction module run by the processor.

In operation 510, pixel-level fusion is respectively performed on the plurality of region features corresponding to the same instance candidate region, to obtain a first fusion feature of each instance candidate region.

In an optional instance, the operation 510 is performed by a processor by invoking a corresponding instruction stored in a memory, or is performed by a first fusion module run by the processor.

Then, operations 512 and 516 are executed respectively.

In operation 512, instance segmentation is performed based on the first fusion feature of each instance candidate region to obtain the instance segmentation result of each instance candidate region.

The instance segmentation result includes an object box or position of each instance and an instance class to which the instance belongs.

In an optional example, operation 512 may be executed by a processor by invoking a corresponding instruction stored in a memory, or may be executed by a first segmentation unit run by the processor.

Then, following procedures of this application embodiment are not executed.

In operation 514, pixel-level instance class prediction is respectively performed based on the first fusion feature of each instance candidate region, to obtain the instance class prediction result of each instance candidate region, and pixel-level foreground and background prediction is respectively performed based on the first fusion feature of each instance candidate region, to obtain the foreground and background prediction result of each instance candidate region.

In an optional example, the operation 514 is performed by a processor by invoking a corresponding instruction stored in a memory, or is performed by a first segmentation unit or a first prediction sub-unit and a second prediction sub-unit in the first segmentation unit run by the processor.

In operation 516, pixel-level summing is performed on the object class prediction result of the first fusion feature of each instance candidate region and the foreground and background prediction result, to obtain the instance segmentation result of the instance candidate region corresponding to the first fusion feature.

The instance segmentation result includes: the element belonging to a certain instance in the current instance candidate region and the instance class to which the instance belongs, where the instance claims may be: background or a certain instance class.

In an optional example, the operation 516 is performed by a processor by invoking a corresponding instruction stored in a memory, or is performed by a first segmentation unit or an obtaining sub-unit in the first segmentation unit run by the processor.

No specific executing order for executing operation 512 and operations 514-516 exists, i.e., they can be executed at the same time, and can also be executed at any time order.

In addition, in the embodiments of the present disclosure, after obtaining the first fusion feature of each instance candidate region, semantic segmentation can further be performed on at least a part of the regions of the image based on the first fusion feature, to obtain the semantic segmentation result.

In addition, in the embodiments of the present disclosure, after obtaining the second fusion feature of each instance candidate region, semantic segmentation can further be performed on at least a part of the regions of the image based on the second fusion feature, to obtain the semantic segmentation result.

The semantic segmentation result may include, for example, the class to which each element belongs in the at least a part of the regions in the image.

In embodiments of the present invention, at least a part of regions of the image may be all regions or a partial region (e.g., the candidate region) of the image, i.e., semantic segmentation can be performed on the entire image to obtain the semantic segmentation result of the image and semantic segmentation can also be performed on the partial image (e.g., the candidate region) to obtain the semantic segmentation result of the partial region. The candidate region may be, for example, the instance candidate region in each embodiment, or may also be a candidate region generated by other means.

In an optional example, the operation for performing semantic segmentation on at least a part of regions of the image is performed by a processor by invoking a corresponding instruction stored in a memory, or is executed by a segmentation module or in the segmentation module run by the processor.

Based on the embodiments, the semantic segmentation on at least a part of regions of the image is implemented. In addition, based on the first fusion feature or the second fusion feature, performing semantic segmentation on the at least a part of regions of the image may improve the accuracy of the image semantic segmentation result by using context information.

In should be explained that in the embodiments of the present disclosure, after obtaining the second fusion feature of each instance candidate region, instance segmentation can also be performed based on the second fusion feature, to obtain at least one of the instance segmentation result of the corresponding instance candidate region or the instance segmentation result of the image. The implementation of performing instance segmentation based on the second fusion feature, to obtain at least one of the instance segmentation result of the corresponding instance candidate region or the instance segmentation result of the image can refer to the embodiments of performing the instance segmentation based on the first fusion feature, to obtain at least one of the instance segmentation result of the corresponding instance candidate region or the instance segmentation result of the image; both can be implemented by using similar solutions, and details are not described below again.

Any instance segmentation method provided by the embodiments of the present disclosure is executed by any appropriate device having data processing capability, including, but not limited to, a terminal device and a server. Alternatively, any instance segmentation method provided in the embodiments of the present disclosure is executed by a processor, for example, any instance segmentation method mentioned in the embodiments of the present disclosure is executed by the processor by invoking a corresponding instruction stored in a memory. Details are not described below again.

A person of ordinary skill in the art may understand that all or some steps for implementing the foregoing method embodiments are achieved by a program by instructing related hardware; the foregoing program can be stored in a computer-readable storage medium; when the program is executed, steps including the foregoing method embodiments are executed. Moreover, the foregoing storage medium includes various media capable of storing program codes, such as Read-Only Memory (ROM), Random Access Memory (RAM), a magnetic disk, or an optical disk.

Figure 7:
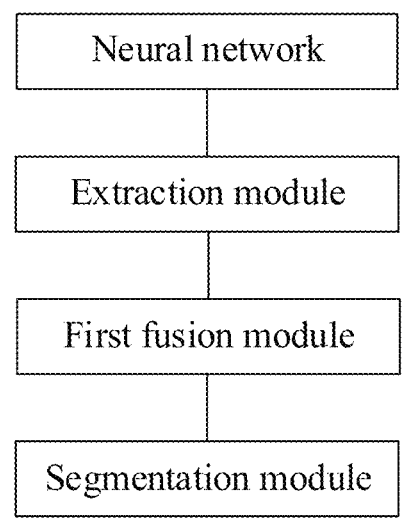
FIG. 7 is a structural schematic diagram of an embodiment of an instance segmentation apparatus of the present disclosure.

FIG. 7 is a structural schematic diagram of an embodiment of an instance segmentation apparatus of the present disclosure. The instance segmentation apparatus in this embodiment can be used for implementing each instance segmentation method embodiment of the present disclosure. As shown in FIG. 7, the apparatus in this embodiment includes: a neural network, an extraction module, a first fusion module, and a segmentation module, where the neural network is configured to perform feature extraction on an image to output features at at least two different hierarchies.

The neural network may include at least two network layers with different network depths for performing feature extraction on the image and outputting features at the at least two hierarchies by means of the at least two network layers with the different network depths.

The extraction module is configured to extract region features corresponding to at least one instance candidate region in the image from the features at the at least two different hierarchies.

The first fusion module is configured to fuse region features corresponding to a same instance candidate region, to obtain a first fusion feature of each instance candidate region.

The segmentation module is configured to perform instance segmentation based on each first fusion feature, to obtain at least one of an instance segmentation result of the corresponding instance candidate region or an instance segmentation result of the image.

Based on the instance segmentation apparatuses provided by the embodiments of the present disclosure, the method includes: performing feature extraction on an image via a neural network to output features at at least two different hierarchies; extracting region features corresponding to at least one instance candidate region in the image from the features at the two different hierarchies, and fusing region features corresponding to a same instance candidate region, to obtain a first fusion feature of each instance candidate region; and performing instance segmentation based on each first fusion feature, to obtain at least one of an instance segmentation result of the corresponding instance candidate region or an instance segmentation result of the image. Embodiments of the present disclosure design solving the problem of instance segmentation based on a deep-learning framework; since the deep-learning has a strong modeling capability, it facilitates to obtain a better instance segmentation result. In addition, performing instance segmentation on the instance candidate region, with respect to directly performing instance segmentation on an entire image, can improve accuracy of instance segmentation, reduce the computing amount and complexity required for the instance segmentation, and improve the instance segmentation efficiency. Moreover, extracting region features corresponding to the instance candidate region from the features at the at least two different hierarchies for fusing and performing the instance segmentation based on the obtained fusion feature enable each instance candidate region to obtain information at different hierarchies at the same time; since the information extracted from the features at different hierarchies are all at different semantic hierarchies, accuracy of the instance segmentation result of each instance candidate region can be improved via context information.

Figure 8:
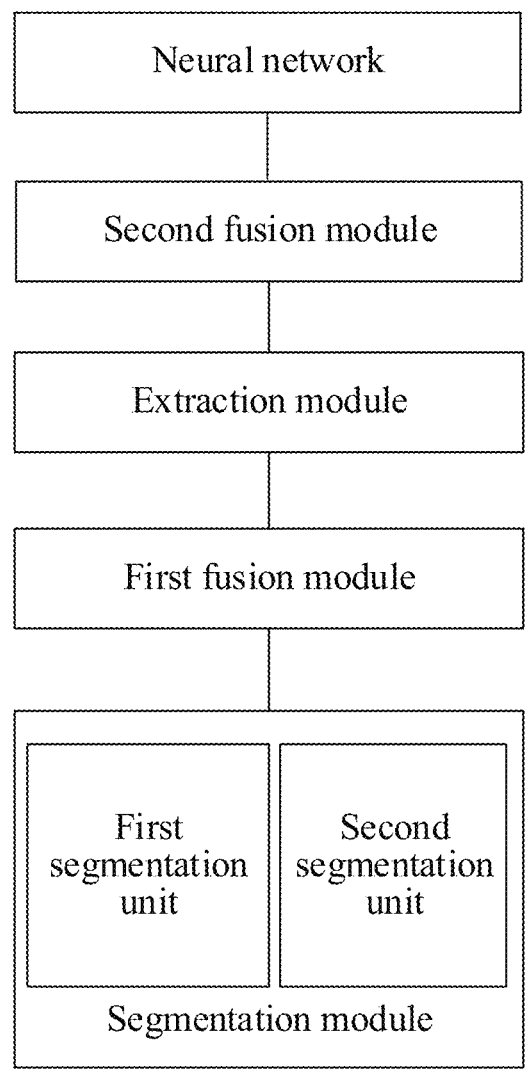
FIG. 8 is a structural schematic diagram of another embodiment of the instance segmentation apparatus of the present disclosure.

FIG. 8 is a structural schematic diagram of another embodiment of the instance segmentation apparatus of the present disclosure. As shown in FIG. 8, upon comparison with the embodiment shown in FIG. 7, the instance segmentation apparatus of this embodiment further includes: a second fusion module, configured to perform at least one retracing fusion on the features at the at least two different hierarchies to obtain a second fusion feature. The one retracing fusion includes: fusing the features at different hierarchies output by the network layers with different network depths respectively based on a network depth direction of the neural network according to two different hierarchy directions in sequence. Accordingly, in this embodiment, the extraction module is configured to extract the region features corresponding to the at least one instance candidate region from the second fusion feature.

In an embodiment, the two different hierarchy directions may include: a direction from high hierarchy features to low hierarchy features and a direction from the low hierarchy features to the high hierarchy features.

Therefore, the according to the two different hierarchy directions in sequence may include: along the direction from the high hierarchy features to the low hierarchy features and the direction from the low hierarchy features to the high hierarchy features in sequence; or along the direction from the low hierarchy features to the high hierarchy features and the direction from the high hierarchy features to the low hierarchy features in sequence.

In an optional example, the second fusion module, when fusing the features at the different hierarchies output by the network layers with the different network depths respectively along the direction from the high hierarchy features to the low hierarchy features and the direction from the low hierarchy features to the high hierarchy features in sequence, is configured to: along a direction from deep to shallow of the network depth of the neural network, after upsampling features at a higher hierarchy output by a network layer with a deeper network depth in the neural network in sequence, fuse the upsampled features with features at a lower hierarchy output by a network layer with a shallower network depth, to obtain a third fusion feature; and along the direction from the low hierarchy features to the high hierarchy features, after downsampling fusion features at a lower hierarchy in sequence, fuse the downsampled fusion features with fusion features at a higher hierarchy in the third fusion feature.

The features at a higher hierarchy, for example, may include: features output by the network layer with a deeper network depth in the neural network or features obtained by performing at least one feature extraction on the features output by the network layer with the deeper network depth.

In an optional example, the second fusion module, after upsampling features at the higher hierarchy output by the network layer with the deeper network depth in the neural network in sequence, when fusing the upsampled features with the features at the lower hierarchy output by the network layer with the shallower network depth, is configured to: after upsampling the features at the higher hierarchy output by the network layer with the deeper network depth in the neural network in sequence, fuse the upsampled features with adjacent features at the lower hierarchy output by the network layer with the shallower network depth.

In an optional example, the second fusion module, after downsampling fusion features at the lower hierarchy in sequence, when fusing the downsampled fusion features with the fusion features at the higher hierarchy in the third fusion feature, is configured to: after downsampling the fusion features at the lower hierarchy in sequence, fuse the downsampled fusion features with adjacent fusion features at the higher hierarchy in the third fusion feature.

In an optional example, the second fusion module, when fusing the features at different hierarchies output by the network layers with the different network depths respectively along the direction from the low hierarchy features to the high hierarchy features and the direction from the high hierarchy features to the low hierarchy features in sequence, is configured to: along a direction from shallow to deep of the network depth of the neural network, after downsampling features at a lower hierarchy output by a network layer with a shallower network depth in the neural network in sequence, fuse the downsampled features with features at the higher hierarchy output by the network layer with the deeper network depth, to obtain a fourth fusion feature;

along the direction from the high hierarchy features to the low hierarchy features, after upsampling fusion features at a higher hierarchy in sequence, fuse the upsampled fusion features with fusion features at a lower hierarchy in the fourth fusion feature.

The features at a lower hierarchy, for example, may include: features output by the network layer with a shallower network depth in the neural network or features obtained by performing at least one feature extraction on the features output by the network layer with the shallower network depth.

In an optional example, the second fusion module, after downsampling features at the lower hierarchy output by the network layer with the shallower network depth in the neural network in sequence, when fusing the downsampled features with the features at the higher hierarchy output by the network layer with the deeper network depth, is configured to: after downsampling the features at the lower hierarchy output by the network layer with the shallower network depth in the neural network in sequence, fuse the downsampled features with adjacent features at the higher hierarchy output by the network layer with the deeper network depth.

In an optional example, the second fusion module, after upsampling fusion features at the higher hierarchy in sequence, when fusing the upsampled fusion features with the fusion features at the lower hierarchy in the fourth fusion feature, is configured to: after upsampling the fusion features at the higher hierarchy in sequence, fuse the upsampled fusion features with adjacent fusion features at the lower hierarchy in the fourth fusion feature.

In an optional example, the first fusion module, when fusing region features corresponding to a same instance candidate region, is configured to: respectively perform pixel-level fusion on a plurality of region features corresponding to the same instance candidate region.

For example, the first fusion module, when performing the pixel-level fusion on the plurality of region features corresponding to the same instance candidate region, is configured to: respectively perform element-wise max on the plurality of region features corresponding to the same instance candidate region; or respectively perform element-wise averaging on the plurality of region features corresponding to the same instance candidate region; or respectively perform element-wise summing on the plurality of region features corresponding to the same instance candidate region.

In addition, further referring to FIG. 8, in one of the embodiments of the present disclosure, the segmentation module may include:

a first segmentation module, configured to perform the instance segmentation on the instance candidate region corresponding to a first fusion feature based on the first fusion feature, to obtain the instance segmentation result of the corresponding instance candidate region; and/or, a second segmentation module, configured to perform the instance segmentation on the image based on each first fusion feature, to obtain the instance segmentation result of the image.

Figure 9:
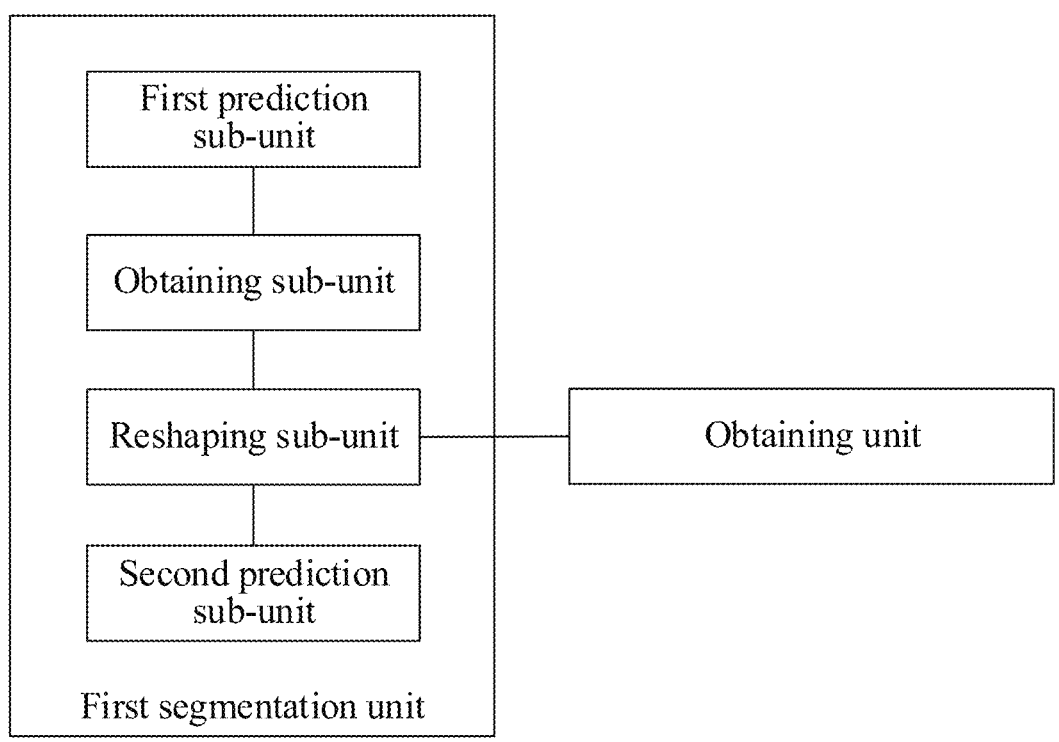
FIG. 9 is a structural schematic diagram of an embodiment of a segmentation module in the embodiments of the present disclosure.

FIG. 9 is a structural schematic diagram of an embodiment of a segmentation module in the embodiments of the present disclosure. As shown in FIG. 9, in the embodiments of the present disclosure, the segmentation module may include:

a first segmentation unit, configured to respectively perform the instance segmentation on the instance candidate region corresponding to the each first fusion feature based on the each first fusion feature, to obtain the instance segmentation result of each instance candidate region; and an obtaining unit, configured to obtain the instance segmentation result of the image based on the instance segmentation result of the each instance candidate region.

In an embodiment, the first segmentation unit includes:

a first prediction sub-unit, configured to perform pixel-level instance class prediction based on the first fusion feature;

a second prediction sub-unit, configured to perform pixel-level foreground and background prediction based on the first fusion feature, to obtain a foreground and background prediction result of the instance candidate region corresponding to the first fusion feature; and an obtaining sub-unit, configured to obtain the instance segmentation result of the instance candidate region corresponding to the first fusion feature based on the instance class prediction result and the foreground and background prediction result.

In an optional example, the second prediction sub-unit is configured to predict an element belonging to a foreground and/or an element belonging to a background in the instance candidate region corresponding to the first fusion feature based on the first fusion feature.

The foreground includes portions corresponding to all instance classes, and the background includes portions other than the portions corresponding to all instance classes; or the background includes portions corresponding to all instance classes, and the foreground includes portions other than the portions corresponding to all instance classes.

In an optional example, the first prediction sub-unit may include: a first convolutional network, configured to perform feature extraction on the first fusion feature; the first convolutional network including at least one fully convolutional layer; and a first fully convolutional layer, configured to perform pixel-level object class prediction based on a feature output by the first convolutional network.

In an optional example, the second prediction sub-unit may include: a second convolutional network, configured to perform feature extraction on the first fusion feature; the second convolutional network including at least one fully convolutional layer; and a full connection layer, configured to perform pixel-level foreground and background prediction based on a feature output by the second convolutional network.

In an optional example, the obtaining sub-unit is configured to: perform pixel-level summing on the object class prediction result of the instance candidate region corresponding to the first fusion feature and the foreground and background prediction result of the instance candidate region corresponding to the first fusion feature, to obtain the instance segmentation result of the instance candidate region corresponding to the first fusion feature.

In addition, further referring to FIG. 9, in another embodiment, the first segmentation unit may further include: a reshaping sub-unit, configured to reshape the foreground and background prediction result into a foreground and background prediction result with a dimension consistent with that of the instance class prediction result. Accordingly, in this embodiment, the obtaining sub-unit is configured to perform pixel-level summing on the instance class prediction result of the instance candidate region corresponding to the first fusion feature and the reshaped foreground and background prediction result of the instance candidate region corresponding to the first fusion feature.

In addition, in one embodiment of the embodiments of the present disclosure, the segmentation module may further include: a third segmentation unit, configured to perform semantic segmentation on at least a part of regions of the image based on the first fusion feature to obtain a semantic segmentation result; or, configured to perform semantic segmentation on at least a part of regions of the image based on the second fusion feature to obtain a semantic segmentation result.

In addition, another electronic device provided in the embodiments of the present disclosure includes:

a memory, configured to store a computer program; and a processor, configured to execute the computer program stored in the memory, where when the computer program is executed, the method according to the embodiments of the present disclosure is implemented.

Figure 10:
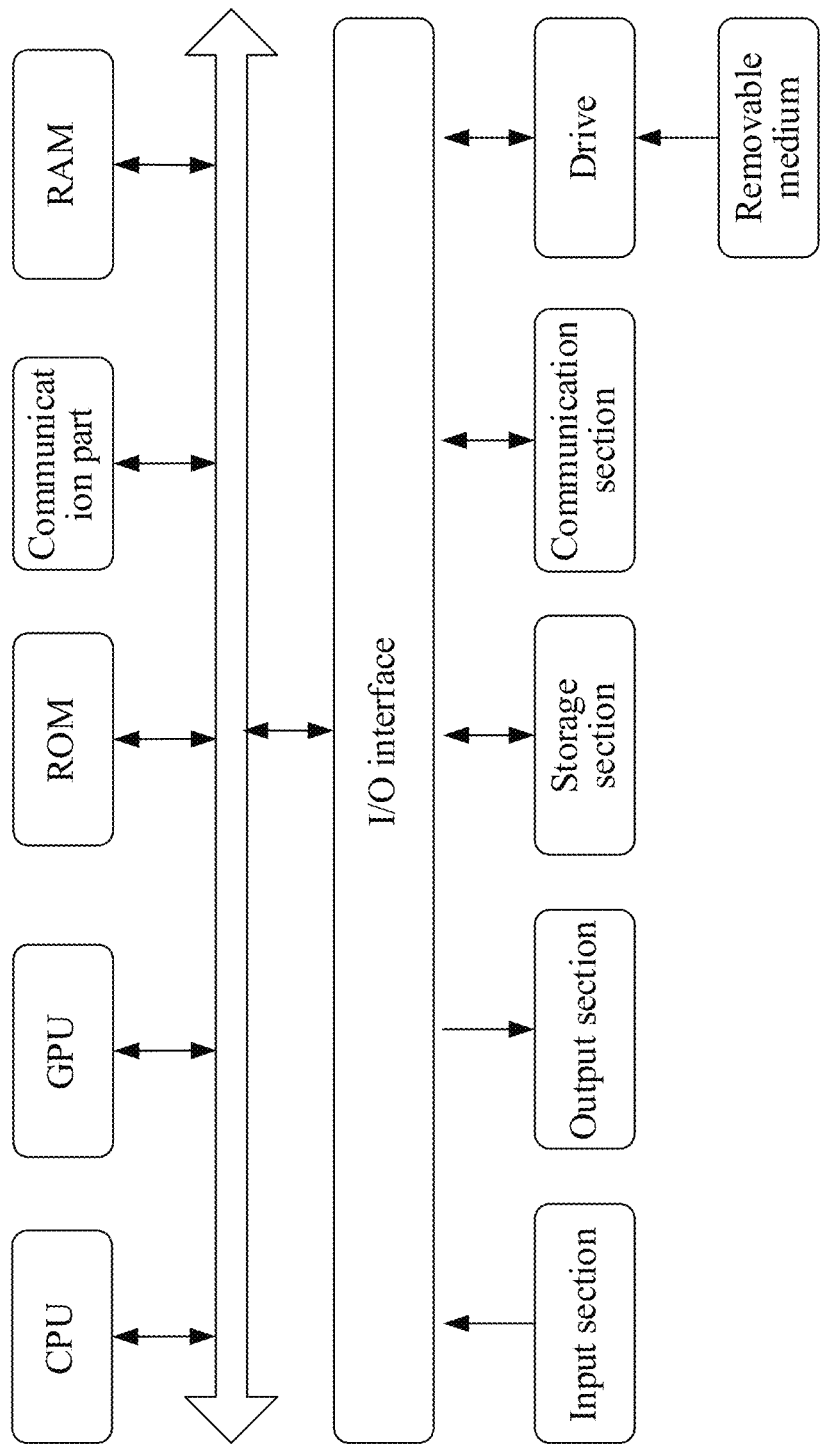
FIG. 10 is a structural schematic diagram of an embodiment of an electronic device in the embodiments of the present disclosure.

FIG. 10 is a schematic structural diagram of an application embodiment of an electronic device of the present disclosure. Referring to FIG. 10 below, a schematic structural diagram of an electronic device, which may be a terminal device or a server, suitable for implementing the embodiments of the present disclosure is shown. As shown in FIG. 10, the electronic device includes one or more processors, a communication part, and the like. The one or more processors are, for example, one or more Central Processing Units (CPUs), and/or one or more Graphic Processing Units (GPUs), and the like. The processor may perform various appropriate actions and processing according to executable instructions stored in a Read-Only Memory (ROM) or executable instructions loaded from a storage section to a Random Access Memory (RAM). The communication part may include, but not limited to, a network card. The network card may include, but not limited to, an Infiniband (TB) network card. The processor may communicate with the ROM and/or the RAM, to execute executable instructions. The processor is connected to the communication part via a bus, and communicates with other target devices via the communication part, thereby implementing corresponding operations in any method provided in the embodiments of the present disclosure, for example, performing feature extraction on an image via a neural network to output features at at least two different hierarchies; extracting region features corresponding to at least one instance candidate region in the image from the features at the at least two different hierarchies, and fusing region features corresponding to a same instance candidate region, to obtain a first fusion feature of each instance candidate region; and performing instance segmentation based on each first fusion feature, to obtain at least one of an instance segmentation result of the corresponding instance candidate region or an instance segmentation result of the image.

In addition, the RAM may further store various programs and data required for operations of an apparatus. The CPU, the ROM, and the RAM are connected to each other via the bus. In the presence of the RAM, the ROM is an optional module. The RAM stores executable instructions, or writes the executable instructions into the ROM during running, where the executable instructions cause the processor to execute corresponding operations of any method of this disclosure. An input/output (I/O) interface is also connected to the bus. The communication part may be integrated, or may be configured to have a plurality of sub-modules (for example, a plurality of IB network cards) connected to the bus.

The following components are connected to the I/O interface: an input section including a keyboard, a mouse and the like; an output section including a Cathode-Ray Tube (CRT), a Liquid Crystal Display (LCD), a speaker and the like; the storage section including a hard disk and the like; and a communication section of a network interface card including an LAN card, a modem and the like. The communication section performs communication processing via a network such as the Internet. A drive is also connected to the I/O interface according to requirements. A removable medium such as a magnetic disk, an optical disk, a magneto-optical disk, a semiconductor memory or the like is mounted on the drive according to requirements, so that a computer program read from the removable medium may be installed on the storage section according to requirements.

It should be noted that the architecture illustrated in FIG. 10 is merely an optional implementation mode. During specific practice, the number and types of the components in FIG. 10 may be selected, decreased, increased, or replaced according to actual requirements. Different functional components may be separated or integrated or the like. For example, the GPU and the CPU may be separated, or the GPU may be integrated on the CPU, and the communication portion may be separated from or integrated on the CPU or the GPU or the like. These alternative implementations all fall within the scope of protection of this disclosure.

Particularly, a process described above with reference to a flowchart according to the embodiments of the present disclosure is implemented as a computer software program. For example, the embodiments of this disclosure include a computer program product. The computer program product includes a computer program tangibly included in a machine-readable medium. The computer program includes a program code for performing a method shown in the flowchart. The program code may include instructions for performing steps of the face anti-counterfeiting detection method provided in the embodiments of the present disclosure. In such an embodiment, the computer program is downloaded and installed from the network through the communication section, and/or is installed from the removable medium. When the computer program is executed by the CPU, the functions defined in the method according to the present disclosure are executed.

In addition, the embodiment of the present disclosure also provides a computer program, including computer instructions. When the computer instructions run in a processor of a device, the instance segmentation method according to any one of the embodiments of the present disclosure is implemented.

In addition, the embodiment of the present disclosure also provides a computer-readable storage medium having a computer program stored thereon. When the computer program is executed by a processor, the instance segmentation method according to any one of the embodiments of the present disclosure is implemented.

Embodiments of the present disclosure have wide applications in fields of autonomous driving, domestic robots, maps, etc., for example, the embodiments of the present disclosure may be applied to an automatic driving scene, to accurately identify different traffic participants in the automatic driving scene; the embodiments of the present disclosure may be applied to a street scene, to identify different buildings and objects used with road sign qualities in the street scene, thereby helping construction of an accurate map; the embodiments of the present disclosure may be applied to a domestic robot, for example, when a robot grasps an object, accurate pixel-level positioning for each object is required; using the embodiments of the present disclosure, accurate identification and positioning for the object can be implemented. It should be understood that the above scenes are only exemplary scenes, and should not be understood as limitations on the scope of protection of the present disclosure.

The embodiments in the specification are all described in a progressive manner, for same or similar parts in the embodiments, refer to these embodiments, and each embodiment focuses on a difference from other embodiments. The system embodiments correspond to the method embodiments substantially and therefore are only described briefly, and for the associated part, refer to the descriptions of the method embodiments.

The methods and apparatuses in this disclosure may be implemented in many manners. For example, the methods and apparatuses in this disclosure may be implemented with software, hardware, firmware, or any combination of software, hardware, and firmware. Unless otherwise specially stated, the foregoing sequences of steps of the methods are merely for description, and are not intended to limit the steps of the methods of this disclosure. In addition, in some embodiments, this disclosure may also be implemented as programs recorded in a recording medium. The programs include machine-readable instructions for implementing the methods according to this disclosure. Therefore, the present disclosure further covers the recording medium storing the programs for executing the methods according to the present disclosure.

The descriptions of this disclosure are provided for the purpose of examples and description, and are not intended to be exhaustive or limit this disclosure to the disclosed form. Many modifications and changes are obvious to a person of ordinary skill in the art. The embodiments are selected and described to better describe a principle and an actual application of the present disclosure, and to make a person of ordinary skill in the art understand the present disclosure, so as to design various embodiments with various modifications applicable to particular use.

The invention claimed is:

1. An instance segmentation method, comprising:
performing feature extraction on an image via a neural network to output features at at least two different hierarchies;
extracting region features corresponding to at least one instance candidate region in the image from the features at the at least two different hierarchies, and fusing region features corresponding to a same instance candidate region, to obtain a first fusion feature of each instance candidate region; and
performing instance segmentation based on each first fusion feature, to obtain at least one of an instance segmentation result of a corresponding instance candidate region or an instance segmentation result of the image.

2. The method according to claim 1, wherein the performing feature extraction on the image via the neural network to output the features at the at least two different hierarchies comprises: performing feature extraction on the image via the neural network to output the features at the at least two different hierarchies via at least two network layers with different network depths in the neural network.

3. The method according to claim 1, further comprising: after outputting the features at the at least two different hierarchies, performing at least one retracing fusion on the features at the at least two different hierarchies to obtain a second fusion feature, wherein the one retracing fusion comprises: fusing the features at different hierarchies output by the network layers with the different network depths respectively based on a network depth direction of the neural network according to two different hierarchy directions in sequence; and
the extracting the region features corresponding to the at least one instance candidate region in the image from the features at the at least two different hierarchies comprises: extracting the region features corresponding to the at least one instance candidate region from the second fusion feature,
wherein the two different hierarchy directions comprise: a direction from high hierarchy features to low hierarchy features and a direction from the low hierarchy features to the high hierarchy features,
wherein the according to the two different hierarchy directions in sequence comprises: along the direction from the high hierarchy features to the low hierarchy features and the direction from the low hierarchy features to the high hierarchy features in sequence; or along the direction from the low hierarchy features to the high hierarchy features and the direction from the high hierarchy features to the low hierarchy features in sequence.

4. The method according to claim 3, wherein the fusing the features at the different hierarchies output by the network layers with the different network depths respectively along the direction from the high hierarchy features to the low hierarchy features and the direction from the low hierarchy features to the high hierarchy features in sequence comprises:
along a direction from deep to shallow of the network depth of the neural network, after upsampling features at a higher hierarchy output by a network layer with a deeper network depth in the neural network in sequence, fusing the upsampled features with features at a lower hierarchy output by a network layer with a shallower network depth, to obtain a third fusion feature; and
along the direction from the low hierarchy features to the high hierarchy features, after downsampling fusion features at a lower hierarchy in sequence, fusing the downsampled fusion features with fusion features at a higher hierarchy in the third fusion feature,
wherein the features at the higher hierarchy comprise: features output by the network layer with a deeper network depth in the neural network or features obtained by performing at least one feature extraction on the features output by the network layer with the deeper network depth.

5. The method according to claim 4, wherein the after upsampling features at the higher hierarchy output by the network layer with the deeper network depth in the neural network in sequence, fusing the upsampled features with the features at the lower hierarchy output by the network layer with the shallower network depth comprises: after upsampling the features at the higher hierarchy output by the network layer with the deeper network depth in the neural network in sequence, fusing the upsampled features with adjacent features at the lower hierarchy output by the network layer with the shallower network depth.

6. The method according to claim 4, wherein the after downsampling fusion features at the lower hierarchy in sequence, fusing the downsampled fusion features with the fusion features at the higher hierarchy in the third fusion feature comprises: after downsampling the fusion features at the lower hierarchy in sequence, fusing the downsampled fusion features with adjacent fusion features at the higher hierarchy in the third fusion feature.

7. The method according to claim 3, wherein the fusing the features at the different hierarchies output by the network layers with the different network depths respectively along the direction from the low hierarchy features to the high hierarchy features and the direction from the high hierarchy features to the low hierarchy features in sequence comprises:
along a direction from shallow to deep of the network depth of the neural network, after downsampling features at a lower hierarchy output by a network layer with a shallower network depth in the neural network in sequence, fusing the downsampled features with features at the higher hierarchy output by the network layer with the deeper network depth, to obtain a fourth fusion feature; and
along the direction from the high hierarchy features to the low hierarchy features, after upsampling fusion features at the higher hierarchy in sequence, fusing the upsampled fusion features with fusion features at a lower hierarchy in the fourth fusion feature,
wherein the features at the lower hierarchy comprise: features output by the network layer with a shallower network depth in the neural network or features obtained by performing at least one feature extraction on the features output by the network layer with the shallower network depth.

8. The method according to claim 7, wherein the after downsampling features at the lower hierarchy output by the network layer with the shallower network depth in the neural network in sequence, fusing the downsampled features with the features at the higher hierarchy output by the network layer with the deeper network depth comprises: after downsampling the features at the lower hierarchy output by the network layer with the shallower network depth in the neural network in sequence, fusing the downsampled features with adjacent features at the higher hierarchy output by the network layer with the deeper network depth.

9. The method according to claim 7, wherein the after upsampling fusion features at the higher hierarchy in sequence, fusing the upsampled fusion features with the fusion features at the lower hierarchy in the fourth fusion feature comprises: after upsampling the fusion features at the higher hierarchy in sequence, fusing the upsampled fusion features with adjacent fusion features at the lower hierarchy in the fourth fusion feature.

10. The method according to claim 1, wherein the fusing the region features corresponding to the same instance candidate region comprises: respectively performing pixel-level fusion on a plurality of region features corresponding to the same instance candidate region,
wherein the performing the pixel-level fusion on the plurality of region features corresponding to the same instance candidate region comprises: respectively performing element-wise max on the plurality of region features corresponding to the same instance candidate region; or respectively performing element-wise averaging on the plurality of region features corresponding to the same instance candidate region; or respectively performing element-wise summing on the plurality of region features corresponding to the same instance candidate region.

11. The method according to claim 1, wherein the performing the instance segmentation based on the each first fusion feature, to obtain at least one of the instance segmentation result of the corresponding instance candidate region or the instance segmentation result of the image comprises at least one of:
performing the instance segmentation on the instance candidate region corresponding to a first fusion feature based on the first fusion feature, to obtain the instance segmentation result of the corresponding instance candidate region; or,
performing the instance segmentation on the image based on the each first fusion feature, to obtain the instance segmentation result of the image.

12. The method according to claim 1, wherein the performing the instance segmentation based on the each first fusion feature, to obtain the instance segmentation result of the image comprises:
respectively performing the instance segmentation on the instance candidate region corresponding to the each first fusion feature based on the each first fusion feature, to obtain the instance segmentation result of each instance candidate region; and
obtaining the instance segmentation result of the image based on the instance segmentation result of the each instance candidate region.

13. The method according to claim 11, wherein the performing the instance segmentation on the instance candidate region corresponding to a first fusion feature based on the first fusion feature, to obtain the instance segmentation result of the corresponding instance candidate region comprises:
  performing pixel-level instance class prediction based on the first fusion feature, to obtain an instance class prediction result of the instance candidate region corresponding to the first fusion feature; performing pixel-level foreground and background prediction based on the first fusion feature, to obtain a foreground and background prediction result of the instance candidate region corresponding to the first fusion feature; and
  obtaining the instance segmentation result of the instance candidate region corresponding to the first fusion feature based on the instance class prediction result and the foreground and background prediction result.

14. The method according to claim 13, wherein the performing pixel-level foreground and background prediction based on the first fusion feature comprises at least one of: predicting pixels belonging to a foreground in the instance candidate region corresponding to the first fusion feature based on the first fusion feature; or,
  predicting pixels belonging to a background in the instance candidate region corresponding to the first fusion feature based on the first fusion feature,
  wherein the foreground comprises portions corresponding to all instance classes, and the background comprises portions other than the portions corresponding to all instance classes; or the background comprises portions corresponding to all instance classes, and the foreground comprises portions other than the portions corresponding to all instance classes.

15. The method according to claim 13, wherein the performing pixel-level instance class prediction based on the first fusion feature comprises:
  performing feature extraction on the first fusion feature via a first convolutional network, the first convolutional network comprising at least one fully convolutional layer; and
  performing pixel-level object class prediction via a first fully convolutional layer based on a feature output by the first convolutional network.

16. The method according to claim 13, wherein the performing pixel-level foreground and background prediction based on the first fusion feature comprises:
  performing feature extraction on the first fusion feature via a second convolutional network, the second convolutional network comprising at least one fully convolutional layer; and
  performing pixel-level foreground and background prediction via a full connection layer based on a feature output by the second convolutional network.

17. The method according to claim 13, wherein the obtaining an instance segmentation result of an instance candidate region corresponding to the first fusion feature based on the instance class prediction result and the foreground and background prediction result comprises: performing pixel-level summing on the object class prediction result of the instance candidate region corresponding to the first fusion feature and the foreground and background prediction result of the instance candidate region corresponding to the first fusion feature, to obtain the instance segmentation result of the instance candidate region corresponding to the first fusion feature,
  after obtaining the foreground and background prediction result of the instance candidate region corresponding to the first fusion feature, further comprising: reshaping the foreground and background prediction result into a foreground and background prediction result with a dimension consistent with that of the instance class prediction result; and
  the performing pixel-level summing on the object class prediction result of the instance candidate region corresponding to the first fusion feature and the foreground and background prediction result of the instance candidate region corresponding to the first fusion feature comprising: performing pixel-level summing on the instance class prediction result of the instance candidate region corresponding to the first fusion feature and the reshaped foreground and background prediction result of the instance candidate region corresponding to the first fusion feature.

18. The method according to claim 1, further comprising: after obtaining the first fusion feature of the each instance candidate region, performing semantic segmentation on at least a part of regions of the image based on the first fusion feature to obtain a semantic segmentation result.

19. An instance segmentation apparatus, comprising:
  a memory storing processor-executable instructions; and
  a processor arranged to execute the stored processor-executable instructions to perform operations of:
  performing feature extraction on an image to output features at at least two different hierarchies;
  extracting region features corresponding to at least one instance candidate region in the image from the features at the at least two different hierarchies;
  fusing region features corresponding to a same instance candidate region, to obtain a first fusion feature of each instance candidate region; and
  performing instance segmentation based on each first fusion feature, to obtain at least one of an instance segmentation result of a corresponding instance candidate region or an instance segmentation result of the image.

20. A non-transitory computer-readable storage medium having stored thereon computer-readable instructions that, when executed by a processor, cause the processor to perform an instance segmentation method, the method comprising:
  performing feature extraction on an image via a neural network to output features at at least two different hierarchies;
  extracting region features corresponding to at least one instance candidate region in the image from the features at the at least two different hierarchies, and fusing region features corresponding to a same instance candidate region, to obtain a first fusion feature of each instance candidate region; and
  performing instance segmentation based on each first fusion feature, to obtain at least one of an instance segmentation result of a corresponding instance candidate region or an instance segmentation result of the image.

* * * * *